United States Patent
Goihman et al.

(10) Patent No.: US 11,180,268 B2
(45) Date of Patent: Nov. 23, 2021

(54) FOOD PACKAGING

(71) Applicant: STEPAC L.A. LTD, Tefen (IL)

(72) Inventors: Alexey Goihman, Western Galilee (IL); Gary Ward, Western Galilee (IL); Ivo Tunchel, Sao Paulo (BR)

(73) Assignee: STEPAC L.A. LTD., Tefen (IL)

( * ) Notice: Subject to any disclaimer, the term of this patent is extended or adjusted under 35 U.S.C. 154(b) by 308 days.

(21) Appl. No.: 15/760,863

(22) PCT Filed: Sep. 15, 2016

(86) PCT No.: PCT/GB2016/052887
§ 371 (c)(1),
(2) Date: Mar. 16, 2018

(87) PCT Pub. No.: WO2017/046595
PCT Pub. Date: Mar. 23, 2017

(65) Prior Publication Data
US 2019/0071200 A1 Mar. 7, 2019

(30) Foreign Application Priority Data
Sep. 18, 2015 (GB) ..................... 1516575

(51) Int. Cl.
*B65D 1/00* (2006.01)
*B65B 25/00* (2006.01)
(Continued)

(52) U.S. Cl.
CPC .............. *B65B 25/001* (2013.01); *A23B 9/20* (2013.01); *B32B 3/26* (2013.01); *B32B 3/266* (2013.01);
(Continued)

(58) Field of Classification Search
CPC ......... B32B 27/34; B32B 27/18; B32B 38/04; B32B 27/08; B32B 3/266; B65B 25/001; B65D 81/263; A23B 9/20
(Continued)

(56) References Cited

U.S. PATENT DOCUMENTS 5,612,104 A 3/1997 Grund
6,190,710 B1 2/2001 Nir et al.
(Continued)

FOREIGN PATENT DOCUMENTS

CL 39416 11/1994
CL 2016003198 A1 1/2018
(Continued)

OTHER PUBLICATIONS

ELVAX EVA, Dow Inc. (accessed on Apr. 6, 2021) (Year: 2021).*
(Continued)

*Primary Examiner* — Ellen S Hock
(74) *Attorney, Agent, or Firm* — The Roy Gross Law Firm, LLC; Roy Gross (57) ABSTRACT

The present invention relates to a layered packaging film for fresh produce. The film provides a water vapour transmission rate of at least 30 g m$^{-2}$ per day, and includes a polymer layer with a sealing temperature of 205° C. or less. The present invention also provides a comprising fresh produce enclosed by a packaging film, wherein the packaging film is sealed by an elongate seal extending along the underside of the package, and wherein the elongate seal has a sealing strength such that when the packaging film is lifted from the upper side of the fresh produce package the seal breaks permitting the packaging film to be removed from the fresh produce in a single lifting action.

19 Claims, 4 Drawing Sheets

(51) Int. Cl.
  *B32B 25/04*  (2006.01)
  *B32B 25/16*  (2006.01)
  *B32B 27/06*  (2006.01)
  *B32B 27/34*  (2006.01)
  *B32B 3/26*   (2006.01)
  *A23B 9/20*   (2006.01)
  *B65D 81/26*  (2006.01)

(52) U.S. Cl.
  CPC ............ *B32B 25/04* (2013.01); *B32B 25/042* (2013.01); *B32B 25/16* (2013.01); *B32B 27/06* (2013.01); *B32B 27/34* (2013.01); *B65D 81/263* (2013.01); *B32B 2250/02* (2013.01); *B32B 2250/03* (2013.01); *B32B 2270/00* (2013.01); *B32B 2307/582* (2013.01); *B32B 2307/724* (2013.01); *B32B 2307/7246* (2013.01); *B32B 2439/46* (2013.01); *B32B 2439/70* (2013.01)

(58) Field of Classification Search
  USPC ................................................ 428/35.2, 35.7
  See application file for complete search history.

(56) References Cited

U.S. PATENT DOCUMENTS

| | | |
|---|---|---|
| 2004/0121054 A1 | 6/2004 | Berrier et al. |
| 2005/0142310 A1* | 6/2005 | Hatley .................... B32B 27/34 428/35.2 |
| 2005/0281495 A1 | 12/2005 | Recchia, Jr. |
| 2014/0370165 A1 | 12/2014 | De Souza Diaz Gutierrez |
| 2015/0366230 A1 | 12/2015 | Malefyt et al. |

FOREIGN PATENT DOCUMENTS

| | | |
|---|---|---|
| CN | 201686196 U | 12/2010 |
| DE | 19618111 A1 | 11/1997 |
| EP | 1029896 A1 | 8/2000 |
| EP | 1084620 A2 | 3/2001 |
| EP | 2993042 A1 | 3/2016 |
| JP | H07315342 A | 12/1995 |
| JP | H08300582 A | 11/1996 |
| JP | H083005852 A | 11/1996 |
| JP | 2002068215 A | 3/2002 |
| JP | 2005219764 A | 8/2005 |
| JP | 2010167697 A | 8/2010 |
| JP | 2011161682 A | 8/2011 |
| WO | WO2002/053374 A1 | 7/2002 |
| WO | WO2002/085619 A1 | 10/2002 |

OTHER PUBLICATIONS

Styrolux 684D, Styrolution (accessed on Apr. 6, 2021) (Year: 2021).*
Ultramid C33 LN, BASF (accessed on Apr. 6, 2021) (Year: 2021).*
Grilon BM 16, EMS-Grivory (accessed on Apr. 6, 2021) (Year: 2021).*
GB1516575.6, Search Report Under Section 17(6) dated Aug. 25, 2016.
GB1516575.6, Search Report Under Section 17(5) dated Mar. 23, 2016.
PCT/GB2016/052887, International Search Report dated Dec. 15, 2016.
PCT/GB2016/052887, Written Opinion dated Dec. 15, 2016.

* cited by examiner

FOOD PACKAGING

CROSS-REFERENCE TO RELATED APPLICATIONS

This application is the National Stage of International Patent Application No. PCT/GB2016/052887 filed Sep. 15, 2016, which claims priority from Great Britain Patent Application No. 1516575.6, filed Sep. 18, 2015, the disclosures of each of which are incorporated herein by reference in their entireties for any and all purposes.

FIELD OF THE INVENTION

The present invention relates to packaging for fresh produce, in particular to a fresh produce package comprising fresh produce enclosed in a packaging film, to a process for packaging fresh produce, and to layered packaging films suitable for packaging fresh produce. The present invention is particularly applicable to the bulk packaging of fresh produce.

BACKGROUND OF THE INVENTION

Low $O_2$ and elevated $CO_2$ concentrations reduce respiration rate, inhibit ethylene (the plant hormone responsible for aging and ripening processes) and inhibit microbial growth (if the $CO_2$ concentration is sufficiently high) of many fresh produce items. Accordingly, maintaining low $O_2$ and elevated $CO_2$ concentrations can increase the shelf life of fresh produce. Control of $O_2$ and $CO_2$ levels is a key feature of equilibrium modified atmosphere packaging for fresh produce. The optimum $O_2$ and $CO_2$ vary depending on the fresh produce in question.

Additionally, it is important to control the concentration of water vapour inside a fresh produce package, since a build-up of water vapour inside the package and in particular condensation on the surface of fresh produce can increase the susceptibility to microbial decay. Some fresh produce items are particularly sensitive to excess moisture, and so it is important to provide packaging which can avoid such a build-up. Therefore, for many items of fresh produce, it is advantageous to use packaging films which exhibit high water vapour transmission rates (WTVR), to facilitate diffusion of water vapour out of the packaging, thereby reducing the risk of microbial decay.

As described in U.S. Pat. No. 6,190,710, polyamide films such as nylon-6 or nylon-66 provide a suitable WVTR for many fresh produce items. In addition, U.S. Pat. No. 6,190,710 describes how polyamide films used in packaging can be perforated to provide control of $O_2$ and $CO_2$ diffusion between the atmosphere inside the package and the surrounding environment. Typically, polyamide films provide a significantly higher WVTR than polyolefin films.

However, a drawback of the polyamide films typically employed in high WVTR modified atmosphere packaging is that they are characterized by high melting points and a narrow sealing temperature range. This can make the sealing of such films difficult and automated packaging processes, such as flow wrapping processes, challenging.

SUMMARY OF THE INVENTION

The present inventors have found that by providing layered packaging films, the above-mentioned problems can be overcome or reduced. In particular, the present inventors have produced a range of layered packaging films which provide the requisite high WVTR for many fresh produce applications, but which have improved sealing properties. Previously, a combination of suitable WVTR and low sealing temperature for this kind of application has been difficult to achieve.

Accordingly, in a first preferred aspect the present invention provides a layered packaging film suitable for packaging fresh produce, comprising a first layer of polymer film and a second layer of polymer film adhered to a first surface of the first layer of polymer film, wherein:

the first layer of polymer film comprises polyamide and has a sealing temperature of 210° C. or more;

the second layer of polymer film is compositionally different from the first layer of polymer film, has a thickness of 5 µm or less, and has a sealing temperature of 205° C. or less; and the layered packaging film has a water vapour transmission rate of at least 30 g m$^{-2}$ per day.

The layered packaging film may further comprise a third layer of polymer film adhered to a second surface of the first layer of polymer film, wherein the third layer of polymer film is compositionally different from the first layer of polymer film, has a thickness of 5 µm or less, and has a sealing temperature of 200° C. or less. The second layer of polymer film and the third layer of polymer film may be composed of the same material. The third layer is particularly suitable for retail packaging applications, for example in making bags containing gussets. In some embodiments it may be preferred that the third layer is not present.

The second layer of may be adhered directly to the first layer (i.e. with no intermediate later). The third layer may be adhered directly to the first layer (i.e. with no intermediate later). The packaging film may consist essentially of the first, second and optionally third layers of polymer film.

Surprisingly, the present inventors have found that the adhesion of the second (and optionally third) layer of polymer film to the first layer of polymer film does not substantially decrease the WVTR of the first layer, and accordingly the present invention provides a combination of the desired low sealing temperature with the high WVTR required for packaging some produce.

The films of the present invention are particularly useful in flow wrapping processes for continuous packaging of fresh produce. Accordingly, in a second preferred aspect the present invention provides use of a layered packaging film according to the first aspect for packaging fresh produce. For example, the layered packaging film may be used in a continuous (e.g. automated) process for packaging fresh produce, for example in a flow wrapping process.

One area where shelf-life extension by modified atmosphere packaging is particularly important is in the supply chain from the original grower/packer through to the end retailer. Typically, the fresh produce will be packaged in bulk for some or all of the shipment from grower/packer to retailer. Therefore, modified atmosphere bulk packaging is an area of particular interest in the field. The ease of removal of the bulk packaging by the retailer or an intermediate packer is an important consideration.

Figure 1:
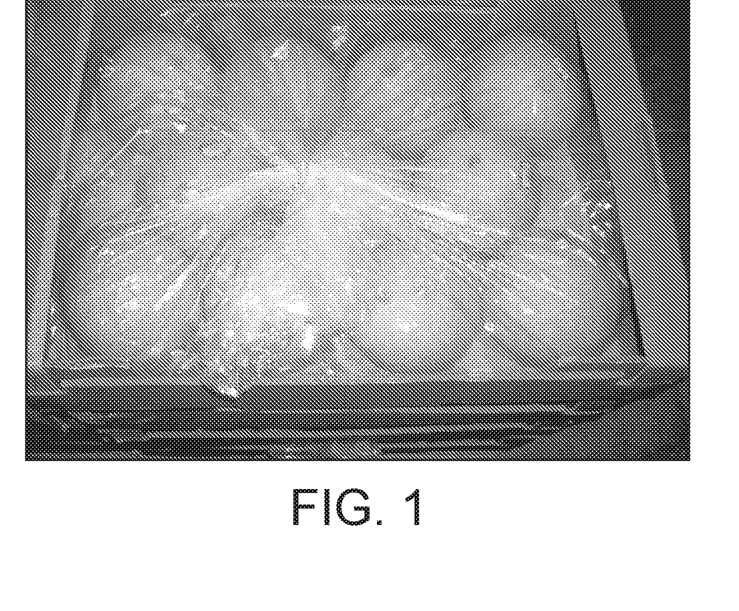
FIG. 1 shows a photograph of a typical bulk packaging arrangement used conventionally.

Conventionally, bulk modified atmosphere packaging of fresh produce has involved putting batches of fresh produce into large bags made of modified atmosphere packaging films which are tied to seal them, as shown in FIG. 1.

The present inventors have found that using flow packaging processes for the packaging of fresh produce in bulk can provide an elegant solution. In particular, the present inventors have found that using a flow packaging process to package fresh produce enables a fresh produce package to be formed having an elongate seal on its underside which although hermetic has a seal strength low enough to permit the seal to be easily broken for packaging removal. Accordingly, in a third preferred aspect the present invention provides a fresh produce package comprising fresh produce enclosed by a packaging film, the fresh produce package having an underside and an upper side, wherein the packaging film is sealed by an elongate seal extending along the underside of the package, and wherein the elongate seal has a sealing strength such that when the packaging film is lifted from the upper side of the fresh produce package the seal breaks permitting the packaging film to be removed from the fresh produce in a single lifting action. Typically, the fresh produce package is a modified atmosphere fresh produce package.

As an alternative, an elongate tear line may be provided on the underside of the package, wherein the tear line has a strength such that when the packaging film is lifted from the upper side of the fresh produce package the tear line tears permitting the packaging film to be removed from the fresh produce in a single lifting action. The tear line may be provided by scoring (e.g. laser scoring) or by perforation (e.g. laser perforation) of the packaging film. In this alternative, the location and strength of any seal is not particularly limited.

Packaging fresh produce in this way reduces film usage and labour costs, and provides an attractive alternative to conventional bulk modified atmosphere packaging.

The films of the first aspect of the present invention are particularly suitable as the packaging film used in the third aspect, since their sealing properties are suited to providing an elongate seal with a suitable seal strength to permit removal of the film in a single lifting action, and the water vapour transmission rate of the films is suitable for packaging fresh produce which is sensitive to water. Where a film according to the first aspect is used, the elongate seal or elongate tear line may alternatively be located on the upper surface of the package, or along one or more sides of the package (e.g. around a perimeter of the package). However, this is less preferred.

In a further preferred aspect the present invention provides a packaging process for fresh produce, comprising flow packing fresh produce to form a fresh produce package according to the third aspect of the invention.

In a further preferred aspect, the present invention provides a process for the manufacture of a layered packaging film according to the first aspect comprising extruding a first polymer for forming the first layer and a second polymer for forming the second layer and forming the first and second polymers into a layered film. Typically, the first and second polymers are extruded simultaneously.

DETAILED DESCRIPTION

Preferred and/or optional features of the invention will now be set out. Any aspect of the invention may be combined with any other aspect of the invention unless the context demands otherwise. Any of the preferred and/or optional features of any aspect may be combined, either singly or in combination, with any aspect of the invention unless the context demands otherwise.

Layered Packaging Film

The first layer of polymer film comprises polyamide. Typically, the first layer of polymer film has a water vapour transmission rate of at least 30 g m$^{-2}$ per day, when measured separately from the second (and optional third) layers of polymer film. It may have a water vapour transmission rate of at least 50 g m$^{-2}$ per day, at least 70 g m$^{-2}$ per day, at least 100 g m$^{-2}$ per day, or at least 120 g m$^{-2}$ per day when measured separately from the second (and optional third) layers of polymer film. The maximum water vapour transmission rate is not particularly limited in the present invention but may be 200 g m$^{-2}$ per day or less, or 160 g m$^{-2}$ per day or less.

Water vapour transmission rate (WVTR) as used herein refers to the water vapour transmission rate determined according to ASTM E96, at 23° C. and 50% relative humidity.

The water vapour transmission rate of a polymer film may be adjusted for example by heat treating or orienting the film, as described in U.S. Pat. No. 6,190,710 which is hereby incorporated by reference in its entirety and in particular for the purpose of describing and defining ways of adjusting the water vapour transmission rate of a polymer film.

Typically, the first layer of polymer film has a thickness of at least 5 μm, more preferably at least 10 μm, at least 15 μm or at least 18 μm. The first layer of polymer film may have a thickness of 30 μm or less, or 25 μm or less.

The first layer of polymer film may be composed of two or more sub-layers which taken together form the first layer of polymer film. The sub-layers may have identical composition to each other, or one or more of the sub-layers may have a different composition. For example, one or more of the sub-layers may include an additive or additives as described in more detail below. One or more of the sub-layers may be substantially free from additives. Typically, all of the sub-layers comprise the same polyamide.

Typically, the first layer of polymer film comprises PA6 (polycaprolactam). It may comprise PA6 in combination with EVA (poly(ethylene vinyl acetate)), EBA (poly(ethylene butyl acrylate)) and/or EMA (poly(ethyl methyl acrylate)). The first layer may comprise at least 1 wt % in total of EVA, EBA and/or EMA with respect to the total weight of the layered packaging film, e.g. at least 3 wt % or at least 5 wt %. The first layer may comprise at least 85 wt % or less in total of EVA, EBA and/or EMA with respect to the total weight of the layered packaging film, e.g. 70 wt % or less, or 50 wt % or less. The addition of EVA, EBA and/or EMA permits the water vapour transmission rate of the first layer of polymer film to be manipulated. Typically, the addition of these polymers tends to reduce the water vapour transmission rate.

The first layer of polymer film has a sealing temperature of 210° C. or more. For example, it may have a sealing temperature of 215° C. or more, or 220° C. or more. The maximum sealing temperature is not particularly limited in the present invention, but is typically 300° C. or less, or 250° C. or less. For example, PA6 has a sealing temperature of 220-245° C.

As used herein, the term sealing temperature is intended to be the lowest temperature at which the layer in question will melt sufficiently to fuse with another layer of the same composition to form a hermetic seal when subjected to heat and pressure in a heat sealing apparatus. The sealing temperature may be measured using a Laboratory Heat Sealer according to ASTM F2029 at constant pressure and sealing time. The pressure may be in the range from 0.05 MPa to 0.7 MPa (e.g. 0.5 MPa) and the sealing time may be in the range from 0.15 s to 0.5 s (e.g. 0.3 s). The sealing temperature may be determined across a range of temperatures, e.g. from 150° C. to 300° C. or 250° C.

Typically, the second layer of polymer film has a water vapour transmission rate (when measured separately from the first layer of polymer film) which is less than the water vapour transmission rate of the first layer (when measured separately from the second layer). For example, the water vapour transmission rate of the second later may be at least 10 g m$^{-2}$ per day less than the water vapour transmission rate of the first layer, e.g. at least 20, at least 40 or at least 50 g m$^{-2}$ per day less.

The water vapour transmission rate of the second layer (when measured separately from the first layer of polymer film) is typically 100 g m$^{-2}$ per day or less, e.g. 80 g m$^{-2}$ per day or less, 60 g m$^{-2}$ per day or less, or 50 g m$^{-2}$ per day or less. It may be at least 10 g m$^{-2}$ per day, at least 20 g m$^{-2}$ per day, at least 30 g m$^{-2}$ per day or at least 50 g m$^{-2}$ per day. Typically, the second layer of polymer film has a thickness of 5 μm or less, more preferably 4 μm or less, 3 μm or less, or 2 μm or less. Typically, the second layer of polymer film has a thickness of at least 0.53 μm or at least 0.8 μm.

The second layer of polymer film may be composed of two or more sub-layers which taken together form the second layer of polymer film. The sub-layers may have identical composition to each other, or one or more of the sub-layers may have a different composition. For example, one or more of the sub-layers may include an additive or additives as described in more detail below. One or more of the sub-layers may be substantially free from additives. Typically, all of the sub-layers comprise the same polymer. In some embodiments, it may be preferred that the second layer of polymer film is formed from a single layer (i.e. does not comprise sub-layers).

The second layer of polymer film has a sealing temperature of 205° C. or less. For example, it may have a sealing temperature of 200° C. or less, 195° C. or less, 190° C. or less, 185° C. or less, 180° C. or less, 175° C. or less, 175° C. or less, or 165° C. or less. The minimum sealing temperature is not particularly limited in the present invention, but is typically 100° C. or more, 125° C. or more, or 140° C. or more. A particularly suitable range is 165-195° C., or 135-200° C.

It is particularly advantageous if the second layer of polymer film has a broad range of sealing temperatures, meaning that a hermetic seal may be achieved at a range of different temperatures, since this makes it more straightforward to use the films in different flow packing equipment and makes it simpler and quicker to achieve a hermetic seal, increasing the throughput of the machinery.

The second layer of polymer film may comprise:
(i) a copolyamide, such as PA6/66, PA6/12, optionally in combination with a multipolyamide such as PA66/69/610/6I;
(ii) a blend of two or more polyamides (homo-, co- or multi-polyamides, for example selected from the group consisting of PA6 (polycaprolactam), PA66 (Polyhexamethylene adipamide), PA12 (Polydodecanolactam), PA69 (Polyhexamethylene azelaamide), PA610 (hexamethylene sebacamide), PA11 (Poly(11-aminoundecanoamide), PA612 Poly(hexamethylene dodecanoamide), PA6/66, PA6/12, and PA66/69/610/6I;
(iii) one or more styrene copolymers, optionally blended with PS (polystyrene) or HIPS (high impact polystyrene), for example one or more styrene copolymers selected from the group consisting of SBS (styrene butadiene styrene copolymer), SBC (styrene butadiene copolymers), SEBS (styrene ethylene butylene styrene), SEPS (styrene ethylene propylene styrene), SIS (styrene isoprene copolymers); or
(iv) a single homopolymer selected from PA11 and PA12.

As the skilled person will understand PA6I (included in multi-polyamide PA66/69/610/6I identified above) is polyhexamethylene isophthalamide.

Particularly suitable is a blend of PA6/66 with PA66/69/610/6I. Particularly suitable is SBS.

Where a copolyamide is combined with a multipolyamide, typically the second layer includes 40-90 wt % of copolyamide and 10-60 wt % of multipolyamide.

The preferred and optional features of the second layer of polymer film described herein apply equally to the optional third layer of polymer film, if present.

The first, second and/or third layers may include one or more additives.

For example, anti-block additive may be added to reduce the risk of blocking, which is the adhesion of two adjacent layers of film. Anti-block additive may be provided to the first, second and/or third layers. Typically, it is provided to one or more sub-layers of the first layer of polymer film, in an amount of 0.1-5 wt % with respect to the total weight of that sub-layer. Alternatively, 0.1-5 wt % of anti-block additive may be added to the second and/or third layers of polymer film (or sub-layers thereof). The skilled person will be familiar with the selection of suitable anti-block additives. Suitable anti-block additives include Ultramid B40LN available from BASF (a high viscosity PA6 with enhanced formability due to the addition of nucleating and slip agents), and Styrolux NB10 available from Styrolution (an SBC polymer including an active wax system to reduce sheet blocking).

An anti-fog additive may be added to reduce fogging of the layered packaging film. The anti-fog additive may be added to any one of the layers or sub-layers, e.g. at a level of 0.1-20 wt % with respect to the total weight of the layer or sub-layer to which it is added, e.g. at a level of 0.5-15 wt %. The skilled person will be familiar with the selection of suitable anti-fog additives. Suitable anti-fog additives include Polybatch AF1088 (a polyolefin based anti-fog additive) available from A. Shulman.

A bonding agent may be added to the second and/or third layers of polymer film to enhance bonding. The skilled person is familiar with the selection of suitable bonding agents. Typically, the bonding agent is added where the second and/or third layer comprises one or more styrene copolymers. Bonding agent is typically added at a level of 5-40 wt %, e.g. 10-35 wt % with respect to the total weight of the layer or sub-layer to which it is added.

Suitable bonding agents are modified polyolefins, e.g. a modified linear low density polyethylene. The polyolefin may be modified with maleic anhydride. A suitable bonding agent is Orevac 18910 available from Arkema.

The particular layers that are chosen for any particular fresh produce packaging application is determined by factors such as produce to be packed, supply chain length, sensitivity to excess moisture, sensitivity to dehydration and surface area to volume ratio. For example, Galia melons are sensitive to excess moisture that aggravates superficial mould. On the other hand, the thick peel of the melons means that they are not particularly sensitive to dehydration.

As such, a film with a water vapour transmission rate of 145 g m$^{-2}$ per day is suitable for shipment of Galia melons from Brazil to mainland Europe.

Typically, the layered packaging film of the present invention has a total thickness of 50 μm or less, e.g. 40 μm or less or 25 μm or less. It may have a thickness of at least 5 μm. or at least 10 μm.

Typically, the layered packaging film of the present invention has a water vapour transmission rate of at least 30 g m$^{-2}$ per day. It may have a water vapour transmission rate of at least 50 g m$^{-2}$ per day, at least 70 g m$^{-2}$ per day, at least 100 g m$^{-2}$ per day, or at least 120 g m$^{-2}$ per day. The maximum water vapour transmission rate is not particularly limited in the present invention but may be 200 g m$^{-2}$ per day or less, or 160 g m$^{-2}$ per day or less. The layered packaging film preferably has a suitable water vapour transmission rate to provide little or no condensation on the internal surface of the packaging film when used to package fresh produce under typical storage and shipment conditions of the produce in question.

Typically, the layered packaging film of the present invention is perforated to provide suitable $O_2$ and $CO_2$ permeability for the fresh produce which is to be packaged, as described in U.S. Pat. No. 6,190,710 which is hereby incorporated by reference in its entirety and in particular for the purpose of describing the perforation of packaging films to increase $O_2$ and $CO_2$ permeability. The number, size and pattern of the perforations required depend on the respiration rate of the produce to be packed and the desired modified atmosphere.

For example, the layered packaging film may be macroperforated to provide holes having a diameter of approximately 1-10 mm covering up to about 0.5% of the surface area of the packaging film, and/or the packaging film may be microperforated to provide holes having a diameter of about 0.05-1 mm diameter at a density of up to about 2000 holes per square metre of material. Preferably, the packaging film is microperforated to provide holes having a diameter of about 0.1-0.8 mm diameter at a density of up to about 500 holes per square metre of material. Microperforations are typically provided by laser. Macroperforations may be provided by physical puncturing or cutting of the film.

For example, a packaging film used for packing 5 kg of Galia melons in a 40×30 cm carton typically contains a total of 44 laser perforations of 125±15 μm, and will provide modified atmosphere conditions of 10-15% $O_2$ and 5-10% $CO_2$ under steady state conditions at 7° C., the optimal storage temperature for Galia melons. The packaging films of the present invention may advantageously be used for bulk packaging of melons, such as Galia melons.

Typically, the layered packaging film of the present invention is formed by extruding a first polymer for forming the first layer and a second polymer for forming the second layer and forming the first and second polymers into a layered film. Typically, the first and second polymers are extruded simultaneously (co-extruded). The extrusion is typically through annular film dies, e.g. with manifolds for the different layers being located at different radial distances from the centre of the die. Air is typically injected into the centre of the die to inflate a bubble of extruded polymer. The bubble is typically then cooled and collapsed to form a flat film. The layered packaging film is typically rolled to provide a roll of packaging film once cooled. The skilled person will be familiar with techniques for forming layered polymer films by extrusion.

Fresh Produce Package

The present invention provides a fresh produce package comprising fresh produce enclosed by a packaging film. Preferably, the fresh produce is enclosed by a single piece of packaging film.

The fresh produce is typically held in a container inside the packaging film. The material of the container is not particularly limited, but may be for example cardboard, wood, pulp or plastic. Typically, the container is open at the upper side to allow the fresh produce to be viewed from the top. This also allows the modified atmosphere packaging to function most effectively. Accordingly, the container may be a tray, for example.

An elongate seal extends along the underside of the package. Preferably the elongate seal extends substantially entirely from one side of the underside of the package to the other side of the package, to facilitate removal of the packaging film as described herein. Preferably the elongate seal extends substantially along a middle line of the underside of the fresh produce package.

Typically, the packaging film is in the form of a tube (formed by sealing a single piece of packaging film with the elongate seal), which tube is sealed at both ends to enclose the fresh produce. The end seals are typically hermetic.

The elongate seal may preferably be a fin seal. Alternatively, it may be formed by overlapping edges of packaging film to form an overlap seal.

The skilled person will understand that the underside of the package is the part of the package which is typically positioned below the fresh produce during packing, storage, transport and/or display. The upper side is on the opposite side of the package, and typically positioned above the fresh produce during packing, storage, transport and/or display. Where the fresh produce is held in a tray or other container, the underside of the package is typically directly beneath the base of the tray or container.

The packaging film can be removed by lifting from the upper side of the fresh produce package in a single lifting action. During packaging removal, typically the elongate seal breaks along at least 60% or at least 80% of its length. For example, it may break along substantially its entire length. Typically, the seal Is broken by the weight of the fresh produce acting against the seal as the packaging film is lifted from the upper side of the fresh produce package in an upward direction.

The seal typically has a seal strength of at least 4 MPa. This provides adequate seal strength to ensure that the package remains sealed during transit. The seal typically has a seal strength of less than 20 MPa, less than 15 MPa or less than 10 MPa. This means that the packaging film can easily be removed in a single lifting action as described herein.

Seal strength is measured according to ASTM F88. A 15 mm width sample of film containing the seal is cut out from the bag. Each tail of the sealed specimen is secured in the opposing grips of a Lloyd LRX tensile tester. The maximum tensile force required to separate the two ends of the seal is recorded.

The elongate seal is typically formed by applying heat and pressure to clamp two areas of packaging film together and cause them to fuse (e.g. two edges of a single piece of packaging film). The fused area forms the elongate seal. Typically, the elongate seal is a hermetic seal. Typically, the elongate seal has a width of between about 2 mm and about 20 mm.

The fresh produce package comprises fresh produce enclosed by a packaging film. The packaging film may advantageously be a layered packaging film as described and defined herein. However, this is not essential.

Other suitable films include single layer packaging films, such as single layer packaging films comprising PA6 blended with one or more co-polyamides or multi-polyamides, or a single layer packaging film comprising co-polyamides optionally blended with a multi-polyamide. The single layer films may include one or more additives as described and defined above with reference to the layered packaging film. The co-polyamide and multi-polyamides are typically as described and defined above with reference to the layered packaging film.

The single layer packaging film may be composed of two or more sub-layers which taken together form the packaging film. The sub-layers may have identical composition to each other, or one or more of the sub-layers may have a different composition. For example, one or more of the sub-layers may include an additive or additives. One or more of the sub-layers may be substantially free from additives. Typically, all of the sub-layers comprise the same polymer or polymer blend. In some embodiments, it may be preferred that the single layer packaging film does not comprise sub-layers.

Typically, the packaging film useful in the fresh produce package of the present invention has a water vapour transmission rate as described above with reference to the layered packaging film. Typically, the packaging film useful in the fresh produce package of the present invention is perforated to provide suitable $O_2$ and $CO_2$ permeability for the fresh produce in question, as described above with reference to the layered packaging film.

The fresh produce package is typically a modified atmosphere package. As used herein, modified atmosphere packaging is intended to include packaging wherein the packaging film has been selected or modified to control one or more of the water vapour, $CO_2$ and $O_2$ concentrations inside the package in order to prolong the shelf life of the packaged fresh produce.

As used herein, the term fresh produce is intended to include fruits, vegetables, flowers, plants, fungi and other edible or inedible horticultural or botanical products which are perishable and tend to spoil or otherwise have a limited shelf life. The present invention is particularly suitable for packaging fruits and vegetables that benefit from modified atmosphere packaging and that are suitable for packing in a container that is subsequently flow packed such as Galia and cantaloupe melons, pomegranates, stone fruits, including nectarines, peaches and plums and kiwi.

The fresh produce package of the present invention is particularly suitable for packaging bulk produce, e.g. for all or part of the supply chain from the original producer through to the end retailer. Typically, bulk packaging contains between 2 kg to 20 kg of fresh produce, e.g. at least 2 kg, at least 3 kg, at least 5 kg or at least 10 kg.

Where an elongate tear line is provided along the underside of the package, preferably the elongate tear line extends substantially entirely from one side of the underside of the package to the other side of the package, to facilitate removal of the packaging film as described herein. Preferably the elongate tear line extends substantially along a middle line of the underside of the fresh produce package.

The packaging film can be removed by lifting from the upper side of the fresh produce package in a single lifting action. During packaging removal, typically the elongate tear line breaks along at least 60% or at least 80% of its length. For example, it may break along substantially its entire length.

An example packaging process according to an embodiment of the present invention will now be described with reference to FIGS. 2 to 6, and removal of the packaging film will be described with reference to FIG. 7.

Figure 2:
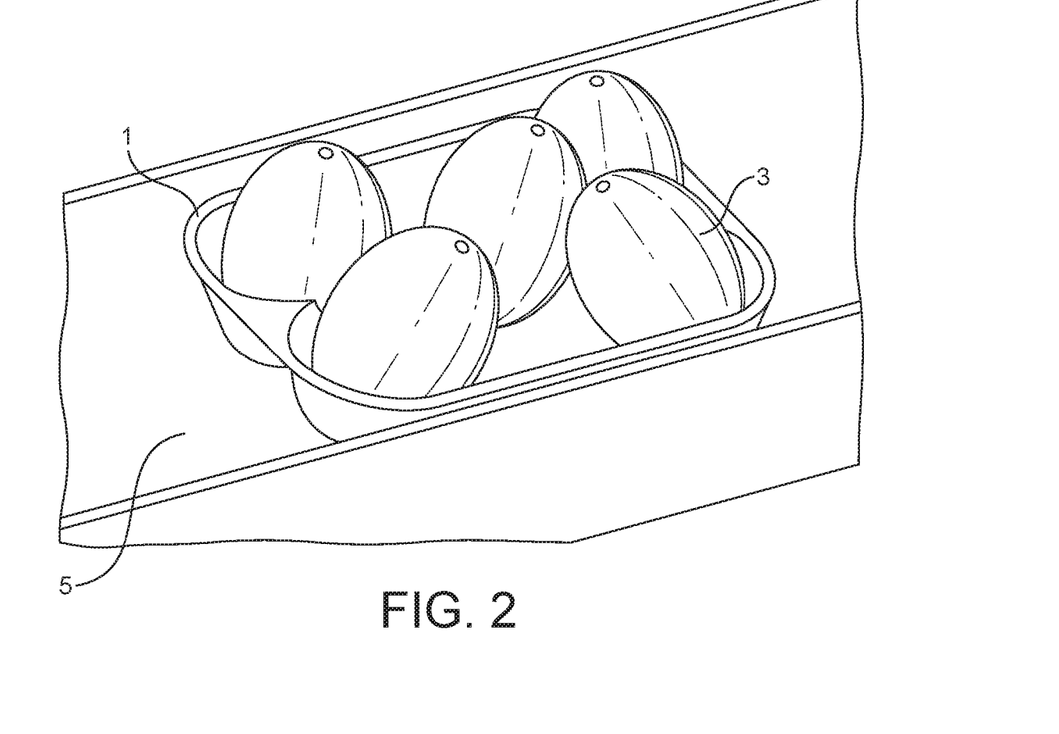
FIGS. 2 to 6 illustrate a process for packaging fresh produce to provide a fresh produce package according to an embodiment of the present invention.
Figure 3:
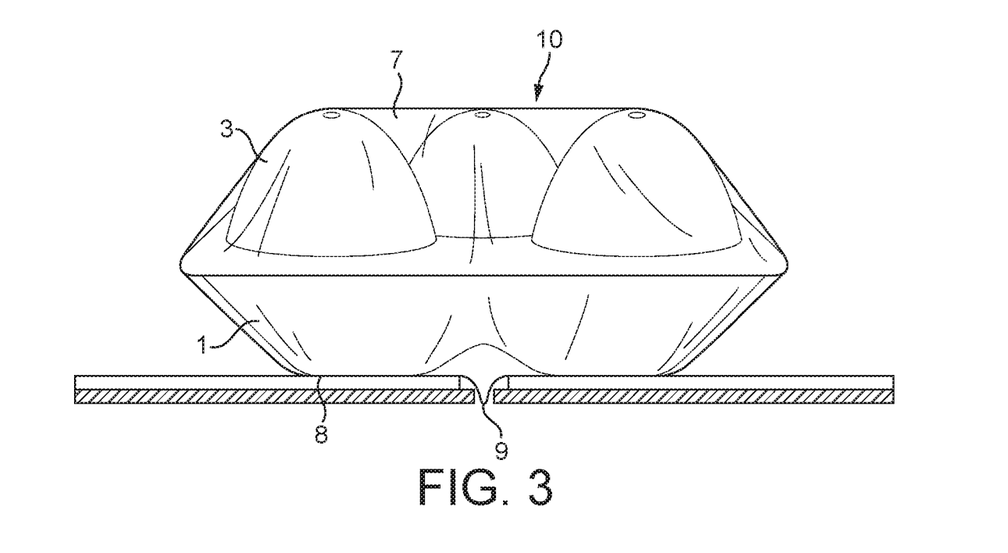

FIG. 2 shows a tray 1 containing fresh produce 3 (e.g. melons) on a conveyor 5. The conveyor 5 moves the tray 1 into a horizontal flow packaging machine. Packaging film 7 (see FIG. 3) is supplied to the flow pack machine and formed into an elongate tube enveloping the tray 1. As shown in FIG. 3, a longitudinal fin seal 9 is formed along the underside 8 of the tray 1 by applying heat and pressure to form the seal 9. The longitudinal fin seal 9 is hermetic but is sufficiently weak that the film may readily be removed from the tray of fresh produce in a single lifting action as described below with reference to FIG. 7.

The film 7 is typically perforated prior to its supply to the flow pack machine to provide the desired $O_2$ and $CO_2$ transmission rates for the fresh produce 3 as described herein. The film 7 is supplied in a suitable orientation that the laser perforations are located on the upper side 10 of the package.

Where a layered packaging film according to the first aspect of the invention is used as the film 7, the film 7 is supplied in a suitable orientation that the second layer is on the underside of the film 7 so that two areas of the second layer come into contact with each other for forming the longitudinal fin seal 9.

Figure 4:
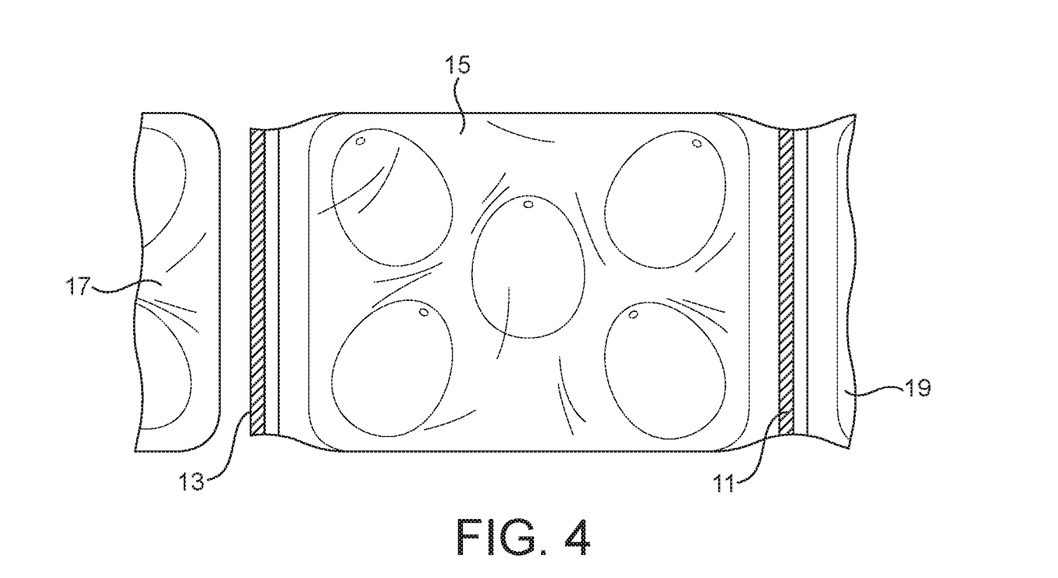

As shown in FIG. 4, two cross seals 11, 13 are formed by applying heat and pressure to seal the package 15. The package 15 is cut from the upstream package 17 and the downstream package 19.

Figure 5:
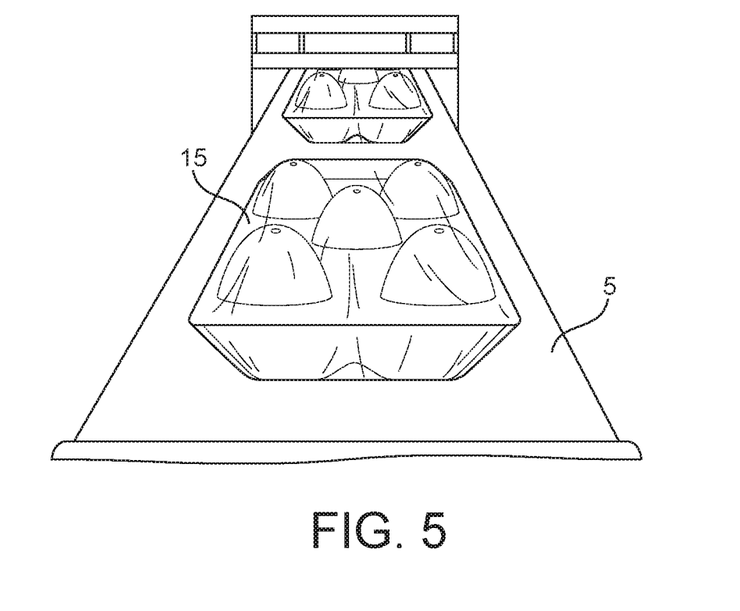
Figure 6:
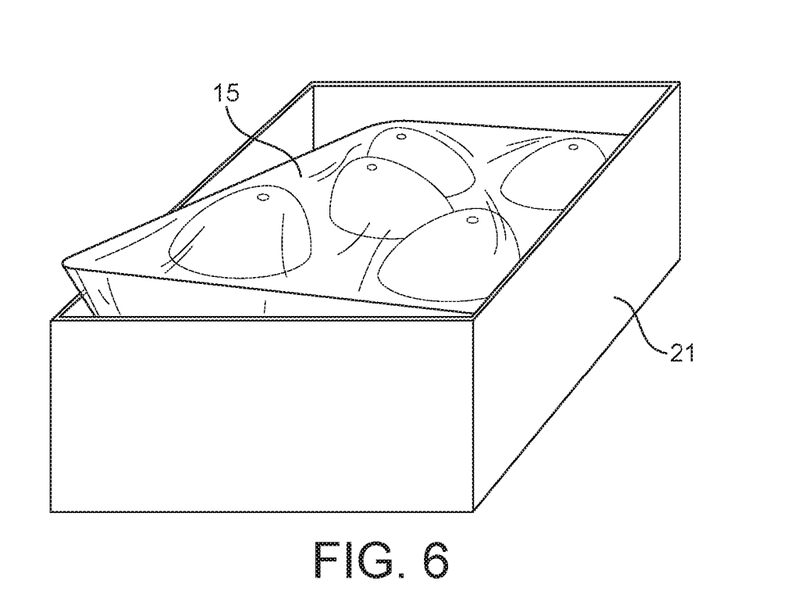

As shown in FIG. 5, the package 15 is then transferred by conveyor 5 to a boxing area where the package 15 is placed in a crate 21 as shown in FIG. 6. Alternatively, the crate 21 may be provided on a lower conveyer and the package 15 slides into the carton from above.

Figure 7:
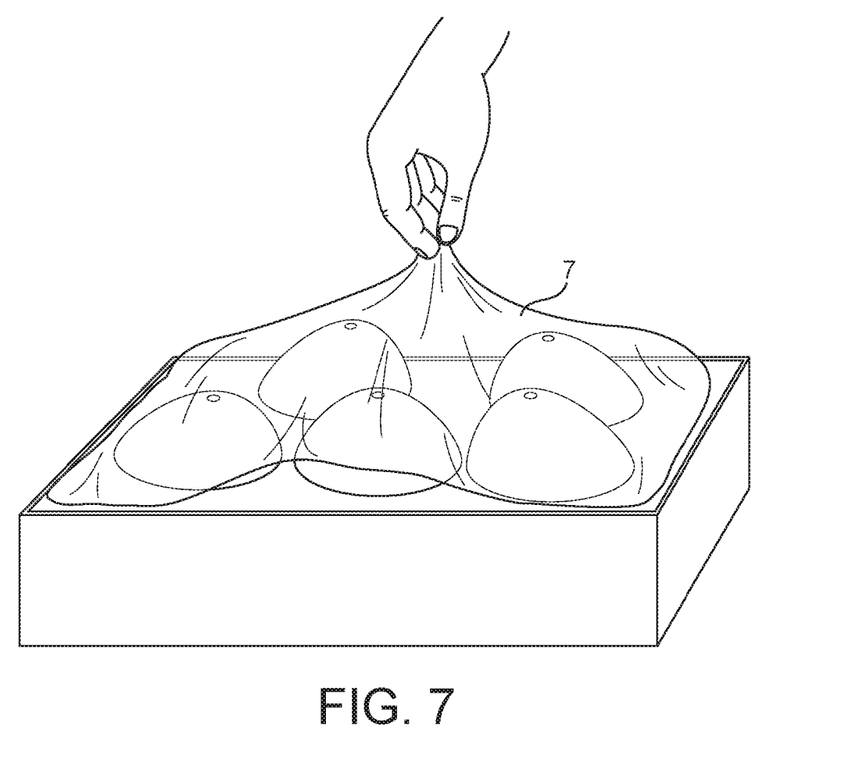
FIG. 7 illustrates removal of packaging film from a fresh produce package according to an embodiment of the present invention.

When the crate 21 reaches its final destination, which may be a supermarket, the packaging film 7 is easily removed as shown in FIG. 7. The film 7 is lifted from the top, which supplies sufficient force to the fin seal 9 on the underside of the package to allow the film 7 to be removed from the tray 1 of fresh produce 3 in a single lifting action. The fresh produce 3 can be displayed by a retailer in the tray 1 without the need to transfer the fresh produce 3 to another container.

EXAMPLES

Layered packaging films according to the present invention were prepared by extrusion through blown film dies. Extruders were used to melt and push molten resin into an annular film die. Each layer was formed by a separate spiral mandrel manifold at a different radial distance from the centre of the die. Air was injected into the centre of the annular die to inflate the polymer bubble. The bubble was cooled by an air ring that blows air on the surface of the bubble to lower its temperature until it solidifies. Above the die, a stabilizing cage was used to minimize movement of the bubble as it was collapsed in the collapsing frame to make a flat film. This film was then pulled over rolls and fed into a film winder to make the finished film roll.

The following temperature profile was used to prepare the layered films:

| | Barrel zones, °C. | | | | Screen Changer, °C. | Adaptor, °C. | Die, °C. |
|---|---|---|---|---|---|---|---|
| | 1 | 2 | 3 | 4 | | | |
| A-Seal Layer | 200 | 210 | 230 | 240 | 240 | 245 | 245 |
| B | 230 | 245 | 245 | 250 | 250 | 250 | 250 |
| C | 230 | 245 | 245 | 250 | 250 | 250 | 250 |
| D | 230 | 245 | 245 | 250 | 250 | 250 | 250 |
| E | 230 | 245 | 245 | 250 | 250 | 250 | 250 |

Testing Methods

Thickness was measured at 24 points across the width of the film using a Millimess Inductive Digital Comparator Extramess 2001

WVTR was measured at 23° C. and 50% relative humidity according to ASTM E96

Seal strength was measured according to ASTM F88. A 15 mm width sample of film containing the seal is cut out from the bag. Each tail of the sealed specimen is secured in the opposing grips of a Lloyd LRX tensile tested. The maximum tensile force required to separate the two ends of the seal was recorded.

Sealing temperature range was measured using a Laboratory Heat Sealer according to ASTM F2029 at constant pressure and time. Dwell time was 0.15-0.5 s in a temperature range of 150-200° C.

Materials

The following materials were used in the Examples below:

| | |
|---|---|
| Copolymer 1 | PA6/66 - available from BASF under brand name Ultramid C33 LN |
| Copolymer 2 | PA66/69/610/6I - available from EMS-GRIVORY under brand name Grilon BM16 |
| PA6 | Available from DSM under brand name Akulon F136-E1 (polycaprolactam) |
| Anti-Block Additive 1 | Available from BASF under brand name Ultramide B40LN |
| Anti-Block Additive 2 | Available from Styrolution under brand name Styrolux NB10 |
| Anti-Fog Additive | Available from Shulman under brand name Polybatch AF1088 |
| SBC | Available from Styrolution under brand name Styrolux 684D |
| Bonding Agent | Available from Arkema under brand name Orevac 18910 |

Abbreviations:

| | |
|---|---|
| PA6 | Polycaprolactam |
| PA66 | Polyhexamethylene adipamide |
| PA69 | Polyhexamethylene azelaamide |
| PA610 | Polyhexamethylene sebacamide |
| PA6I | Isophthalic acid |
| SBC | Styrene butadiene copolymer |

Example 1—Films with Blended Polyamide Sealing Layer

Four examples of film structures having a sealing layer formed from a blend of copolymers were prepared by the process described above, and tested for WVTR, sealing temperature and sealing strength using the testing methods described above. The compositions and testing results are given below.

Example 1.1

| Layer | Thickness/μ | Functionality | Composition | Dosage/wt % |
|---|---|---|---|---|
| 1 | 1 | Sealing Layer | Copolymer 1 | 78 |
| | | | Copolymer 2 | 20 |
| | | | Anti-Block Additive 1 | 2 |
| 2 | 3.7 | High WVTR Layer | PA6 | 100 |
| 3 | 8 | | PA6 | 100 |
| 4 | 3.7 | | PA6 | 100 |
| 5 | 3.6 | | PA6 | 100 |

Example 1.2

| Layer | Thickness/μ | Functionality | Composition | Dosage/wt % |
|---|---|---|---|---|
| 1 | 1 | Sealing Layer | Copolymer 1 | 48 |
| | | | Copolymer 2 | 50 |
| | | | Anti-Block Additive 1 | 2 |
| 2 | 3.7 | High WVTR Layer | PA6 | 100 |
| 3 | 8 | | PA6 | 100 |
| 4 | 3.7 | | PA6 | 100 |
| 5 | 3.6 | | PA6 | 100 |

Example 1.3

| Layer | Thickness/μ | Functionality | Composition | Dosage/wt % |
|---|---|---|---|---|
| 1 | 1 | Sealing Layer | Copolymer 1 | 70 |
| | | | Copolymer 2 | 20 |
| | | | Anti-Block Additive 1 | 2 |
| | | | Anti-Fog Additive | 8 |
| 2 | 3.7 | High WVTR Layer | PA6 | 100 |
| 3 | 8 | | PA6 | 100 |
| 4 | 3.7 | | PA6 | 100 |
| 5 | 3.6 | | PA6 | 100 |

Example 1.4

| Layer | Thickness/μ | Functionality | Composition | Dosage/wt % |
|---|---|---|---|---|
| 1 | 1 | Sealing Layer | Copolymer 1 | 70 |
| | | | Copolymer 2 | 20 |
| | | | Anti-Block Additive 1 | 2 |
| | | | Anti-Fog Additive | 8 |
| 2 | 3.7 | High WVTR Layer | PA6 | 92 |
| | | | Anti-Fog Additive | 8 |
| 3 | 8 | | PA6 | 100 |
| 4 | 3.7 | | PA6 | 100 |
| 5 | 3.6 | | PA6 | 100 |

Example 2—Films with Styrene-Based Sealing Layer

Two examples of film structures having a sealing layer formed from a blend of styrene copolymer and a bonding agent were prepared by the process described above. The compositions of the films are given below.

Example 2.1

| Layer | Thickness/μ | Functionality | Composition | Dosage/wt % |
|---|---|---|---|---|
| 1 | 1 | Sealing Layer | SBC | 74 |
|   |   |   | Bonding Agent | 25 |
|   |   |   | Anti-Block Additive 2 | 1 |
| 2 | 3.7 | High WVTR | PA6 | 100 |
| 3 | 8 | Layer | PA6 | 100 |
| 4 | 3.7 |   | PA6 | 100 |
| 5 | 3.6 |   | PA6 | 100 |

Example 2.2

| Layer | Thickness/μ | Functionality | Composition | Dosage/wt % |
|---|---|---|---|---|
| 1 | 1 | Sealing Layer | SBC | 69 |
|   |   |   | Bonding Agent | 30 |
|   |   |   | Anti-Block Additive 2 | 1 |
| 2 | 3.7 | High WVTR | PA6 | 100 |
| 3 | 8 | Layer | PA6 | 100 |
| 4 | 3.7 |   | PA6 | 100 |
| 5 | 3.6 |   | PA6 | 100 |

Testing Results

Packaging films prepared according to Examples 1 and 2 above were tested as described above. The results were as follows:

| Example | Thickness/ μm | WVTR/g m$^{-2}$ day$^{-2}$ | Sealing Temperature/ °C. | Sealing Strength/MPa |
|---|---|---|---|---|
| 1.1 | 19.8 ± 3 | 145 | 165-195 | >4 |
| 1.2 | 19.7 ± 4 | 145 | 165-195 | >4 |
| 1.3 | 20.1 ± 4 | 145 | 165-195 | >4 |
| 1.4 | 20.1 ± 4 | 145 | 165-195 | >4 |
| 2.1 | 20.7 ± 5 | 145 | 165-195 | >4 |
| 2.2 | 20.7 ± 5 | 145 | 165-195 | >4 |

The WVTR of a 20 μm film of PA6 is also 145 g m$^{-2}$ day$^{-2}$, and accordingly it can be seen that the addition of the sealing layer does not adversely affect the WVTR. However, the sealing temperature of PA6 is 220-245° C., and accordingly it can be seen that the addition of the sealing layer advantageously reduces the sealing temperature.

The invention claimed is:

1. A layered packaging film suitable for packaging fresh produce, comprising a first layer of polymer film and a second layer of polymer film adhered to a first surface of the first layer of polymer film, wherein:
    the first layer of polymer film comprises PA6 polyamide and has a sealing temperature of 210° C. to 300° C.;
    the second layer of polymer film is compositionally different from the first layer of polymer film, has a thickness of 0.5 μm to 5 μm, and has a sealing temperature of 100° C. to 205° C.; and
    the layered packaging film has a water vapour transmission rate of at least 30 g m$^{-2}$ per day; and
    the layered packaging film is arranged such that the second layer of polymer film is the outermost surface of the layered packaging and is configured as a sealing layer for forming seal of a package,
    wherein the second layer of polymer film comprises:
        (i) a blend of PA6 (polycaprolactam), and PA66/69/610/6I; or
        (ii) SBC (styrene butadiene copolymers).

2. A layered packaging film according to claim 1 having a water vapour transmission rate of at least 50 g m$^{-2}$ per day.

3. A layered packaging film according to claim 1, wherein the first layer of polymer film comprises two or more sub-layers.

4. A layered packaging film according to claim 1, wherein the second layer of polymer film has a sealing temperature of 100° C. to 200° C.

5. A layered packaging film according to claim 1, wherein the second layer of polymer film comprises a blend of PA6 with PA66/69/610/6I.

6. A layered packaging film according to claim 1, wherein the second layer of polymer film comprises SBC.

7. A fresh produce package comprising fresh produce enclosed by the packaging film of claim 1, the fresh produce package having an underside and an upper side, wherein the packaging film is sealed by an elongate seal extending along the underside of the package, and wherein the elongate seal has a sealing strength such that when the packaging film is lifted from the upper side of the fresh produce package the seal breaks permitting the packaging film to be removed from the fresh produce in a single lifting action.

8. A fresh produce package according to claim 7, which is a bulk fresh produce package.

9. A fresh produce package according to claim 8, comprising at least 2 kg of fresh produce.

10. A fresh produce package according to claim 7, wherein the fresh produce is held in a container inside the packaging film.

11. A fresh produce package according to claim 7, wherein the fresh produce is enclosed in a single piece of packaging film.

12. A fresh produce package according to claim 7, wherein the elongate seal extends substantially entirely from one side of the underside of the package to the other side of the underside of the package.

13. A fresh produce package according to claim 7, wherein the elongate seal extends substantially along a middle line of the underside of the package.

14. A fresh produce package according to claim 7, wherein the elongate seal is a fin seal.

15. A fresh produce package according to claim 7, wherein the elongate seal has a seal strength in the range from 2 MPa to 20 MPa.

16. A packaging process for fresh produce, comprising flow packing fresh produce to form a fresh produce package as defined in claim 7.

17. A process for the manufacture of a layered packaging film as defined in claim 1 comprising extruding a first polymer for forming the first layer and a second polymer for forming the second layer and forming the first and second polymers into a layered film.

18. The layered packaging film according to claim 1, wherein the first layer of polymer film further comprises one or more of EVA, EVB and EMA.

19. The layered packaging film according to claim 1, wherein the layered packaging film (1) consists essentially of the first layer of polymer film and the second layer of polymer film; or (2) consists essentially of the first layer of polymer film, the second layer of polymer film, and a third layer of polymer film.

* * * * *